(12) United States Patent
Kojima et al.

(10) Patent No.: US 11,892,820 B2
(45) Date of Patent: Feb. 6, 2024

(54) ERROR COMPENSATION METHOD FOR MACHINE TOOL AND MACHINE TOOL

(71) Applicant: OKUMA CORPORATION, Niwa-Gun (JP)

(72) Inventors: Takuya Kojima, Niwa-Gun (JP); Tetsuya Matsushita, Niwa-Gun (JP); Yasunori Kondo, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 746 days.

(21) Appl. No.: 17/077,519

(22) Filed: Oct. 22, 2020

(65) Prior Publication Data

US 2021/0132590 A1 May 6, 2021

(30) Foreign Application Priority Data

Nov. 6, 2019 (JP) .................................. 2019-201711

(51) Int. Cl.
*G05B 19/4155* (2006.01)

(52) U.S. Cl.
CPC .................... *G05B 19/4155* (2013.01); *G05B 2219/49001* (2013.01)

(58) Field of Classification Search
CPC ...... G05B 19/4155; G05B 2219/49001; G05B 2219/50297; G05B 19/404; B23Q 15/12
See application file for complete search history.

(56) References Cited

U.S. PATENT DOCUMENTS

| | | | | |
|---|---|---|---|---|
| 2008/0154527 A1* | 6/2008 | Staaden | ............... | G01D 5/2449 73/1.79 |
| 2012/0187890 A1* | 7/2012 | Otsuki | ............... | G05B 19/4086 318/570 |
| 2012/0253505 A1* | 10/2012 | Matsushita | .......... | G05B 19/401 700/193 |

FOREIGN PATENT DOCUMENTS

JP    H06-138921 A1    5/1994

* cited by examiner

*Primary Examiner* — Mohammad Ali
*Assistant Examiner* — Sheela Rao
(74) *Attorney, Agent, or Firm* — BURR PATENT LAW, PLLC

(57) ABSTRACT

An error compensation method includes outputting at least one of a plurality of calibration-master conditions including a type of a calibration master that includes targets, obtaining measurement values of positions of the targets by detecting the positions of the plurality of targets under the calibration-master condition using a sensor mounted to the main spindle, and calculating an error value using the measurement value and a calibration value of the position of the target. The error compensation method further includes approximating a relation between the measurement values and the error values by a curve and a straight line, calculating a compensation parameter of a positioning error of a translational axis based on an approximate curve in a partial range of a stroke of the translational axis, and calculating the compensation parameter of the positioning error based on an approximate straight line in another range of the stroke of the translational axis.

7 Claims, 13 Drawing Sheets

FIG.5

| No. | CALIBRATION MASTER TYPE | INSTALLATION DIRECTION | INSTALLATION POSITION |
|---|---|---|---|
| 1 | BALL MASTER | X | 0 |
| 2 | BALL MASTER | X | 1000 |
| 3 | BALL MASTER | Y | 0 |

ERROR COMPENSATION METHOD FOR MACHINE TOOL AND MACHINE TOOL

BACKGROUND OF THE INVENTION

This application claims the benefit of Japanese Patent Application Number 2019-201711 filed on Nov. 6, 2019, the entirety of which is incorporated by reference.

TECHNICAL FIELD OF THE INVENTION

The disclosure relates to a method for compensating a motion error occurred in a machine tool and a machine tool configured to execute the method.

DESCRIPTION OF RELATED ART

FIG. 1 is a schematic diagram of a machine tool (machining center) that includes three translational axes. A spindle head 2 is allowed to perform a motion of two degrees of translational freedom in an X-axis and a Z-axis, which are the translational axes and are orthogonal to one another. A table 3 is allowed to perform a motion of one degree of translational freedom in a Y-axis, which is the translational axis and orthogonal to the X-axis and the Z-axis. Accordingly, the spindle head 2 has three degrees of translational freedom with respect to the table 3. Servomotors, which are controlled by a numerical control device, drive respective axes. A workpiece is fixed to the table 3, a tool is installed to a main spindle 2a of the spindle head 2 and rotated, thus machining the workpiece in any shape.

As a motion error in the machine tool, a positioning error, a straightness, and the like are included. The motion errors are transferred to a shape of the workpiece and causes shape and dimensional errors of the workpiece. In contrast, a compensation control using the positioning error and the straightness as parameters ensures a machining with high accuracy. For example, Japanese Unexamined Patent Application Publication No. H6-discloses a method for a compensation control. In the method, a touch probe is used for measuring a reference straight line portion of a master block, a compensation parameter for an error of a linear interpolation feed is calculated based on the measurement result and a preliminarily input deviation of master workpiece shape data, and the compensation control is performed based on the calculated compensation parameter.

The measurement result by the touch probe as disclosed in Japanese Unexamined Patent Application Publication No. H6-138921 includes the error due to measurement variation, and when the measurement result is directly used as a compensation amount, the measurement variation causes a motion error.

Furthermore, when the error of the translational axis is measured using a calibration master as an accuracy reference instead of the master block, it is necessary for an operator to consider which calibration masters to install and how to install the calibration masters, and this is a difficult work for an unskilled operator.

Therefore, it is an object of the disclosure to provide an error compensation method for a machine tool and a machine tool that is easily executable for an unskilled operator and ensures a reduced motion error due to measurement variation in a compensation control.

SUMMARY OF THE INVENTION

In order to achieve the above-described object, an error compensation method for a machine tool according to a first aspect of the disclosure is provided. The error compensation method for the machine tool is a method for compensating a motion error of a translational axis in accordance with a compensation parameter in the machine tool. The machine tool includes two or more translational axes, a table configured to hold a workpiece, and a main spindle configured to hold a tool. The translational axes enable a relative motion of two degrees or more of translational freedom of the tool held onto the main spindle with respect to the workpiece. The machine tool includes an output unit. The error compensation method includes a calibration-master condition outputting step, a calibration master installing step, a calibration master measuring step, an error value calculating step, and a compensation parameter calculating step. The calibration-master condition outputting step is a step of outputting at least one of a plurality of calibration-master conditions to the output unit. The calibration-master conditions include a type of a calibration master that includes a plurality of targets, an installation direction of the calibration master, and an installation position of the calibration master. The calibration master installing step is a step of installing the calibration master on the table in accordance with the output calibration-master condition. The calibration master measuring step is a step of obtaining measurement values of positions of the targets by detecting the positions of the plurality of targets under the calibration-master condition using a sensor mounted to the main spindle. The error value calculating step is a step of calculating an error value using the measurement value obtained under the calibration-master condition and a calibration value of the position of the target. The compensation parameter calculating step is a step of approximating a relation between the measurement values and the error values by a curve and a straight line, calculating the compensation parameter of a positioning error of the translational axis based on an approximate curve in a partial range of a stroke of the translational axis, and calculating the compensation parameter of the positioning error based on an approximate straight line in another range of the stroke of the translational axis.

In the second aspect of the disclosure, in the above-described configuration, the compensation parameter calculating step includes obtaining one of the approximate curve or the approximate straight line for the error values and the measurement values obtained under the calibration-master condition.

In the third aspect of the disclosure, in the above-described configuration, in the compensation parameter calculating step, when the compensation parameter of the positioning error is calculated, a part of a relation between the error values and the measurement values is approximated by a straight line under a first calibration-master condition in a combination of the two calibration-master conditions among the plurality of calibration-master conditions. The first calibration-master condition has the installation position on a negative side. Further, when the compensation parameter of the positioning error is calculated, a part of the relation between the error values and the measurement values is approximated by a straight line under a second calibration-master condition that has the installation position on a positive side. Then, the error value is offset such that the approximate straight line of the first calibration-master condition and the approximate straight line of the second calibration-master condition have an intersection point at an intermediate point between the measurement value at a positive end in the installation direction of the first calibration-master condition and the measurement value at a negative end of the second calibration-master condition.

In the fourth aspect of the disclosure, in the above-described configuration, the compensation parameter calculating step further includes calculating a compensation parameter related to a straightness of the translational axis. In the calculating of the compensation parameter of the straightness, the error values are corrected such that approximate straight lines of the relations between the error values and the measurement values under the respective calibration-master conditions match in a range in which the measurement values of the plurality of calibration-master conditions overlap.

In the fifth aspect of the disclosure, in the above-described configuration, in the compensation parameter calculating step, the approximate curve is a polynomial, and when a difference between a count of the error values and an order of the polynomial is less than a predetermined threshold, the order is decreased.

In the sixth aspect of the disclosure, in the above-described configuration, in the compensation parameter calculating step, when a maximum value of an absolute value of the calculated compensation parameter exceeds a predetermined verification threshold, a fact that the compensation parameter is excessive is notified by the output unit.

In the seventh aspect of the disclosure, in the above-described configuration, in the compensation parameter calculating step, when the maximum value of the absolute value of the calculated compensation parameter exceeds the verification threshold, the compensation parameter is replaced such that the absolute value of the compensation parameter becomes same as the verification threshold.

In order to achieve the above-described object, a machine tool according to an eighth aspect of the disclosure is provided. The machine tool is configured to compensate a motion error of a translational axis in accordance with a compensation parameter. The machine tool includes two or more translational axes, a table configured to hold a workpiece, and a main spindle configured to hold a tool. The translational axes enable a relative motion of two degrees or more of translational freedom of the tool held onto the main spindle with respect to the workpiece. The machine tool includes an output unit. The machine tool includes a calibration-master condition outputting unit, a calibration master measuring unit, an error value calculating unit, and a compensation parameter calculating unit. The calibration-master condition outputting unit outputs at least one of a plurality of calibration-master conditions to the output unit. The calibration-master conditions include a type of a calibration master that includes a plurality of targets, an installation direction of the calibration master, and an installation position of the calibration master. The calibration master measuring unit obtains measurement values of positions of the targets by detecting the positions of the plurality of targets under the calibration-master condition using a sensor mounted to the main spindle in a state where the calibration master is installed on the table in accordance with the output calibration-master condition. The error value calculating unit calculates an error value using the measurement value obtained under the calibration-master condition and a calibration value of the position of the target. The compensation parameter calculating unit approximates a relation between the measurement values and the error values by a curve and a straight line, calculates the compensation parameter of a positioning error of the translational axis based on an approximate curve in a partial range of a stroke of the translational axis, and calculates the compensation parameter of the positioning error based on an approximate straight line in another range of the stroke of the translational axis.

According to the disclosure, by simply installing the calibration master in accordance with the output calibration-master condition, it is allowed for even an unskilled operator to execute the measurement to set the compensation parameter.

Since the measurement result is approximated by the curve and the compensation parameter is calculated based on an approximate curve, the motion error due to the measurement variation in the compensation control can be reduced. Especially, not only the compensation control with high accuracy using the compensation parameter based on an approximate curve is performed within the measurement range of the calibration master, but also the compensation control using the compensation parameter based on an approximate straight line is performed even out of the measurement range. Therefore, the motion error can be reduced in the entire range of the stroke of the translational axis.

BRIEF DESCRIPTION OF THE DRAWINGS

FIG. 5 is an exemplary calibration-master condition of the disclosure.

DETAILED DESCRIPTION OF THE INVENTION

Figure 1:
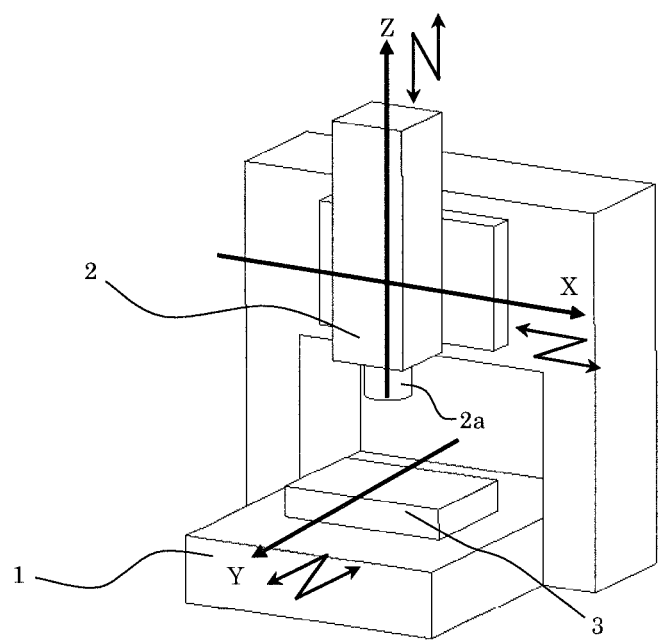
FIG. 1 is a schematic diagram of a machine tool that includes translational axes of an X-axis, a Y-axis, and a Z-axis.

The following describes an embodiment of the disclosure based on the drawings. Here, as an example of a machine tool, a machining center of FIG. 1 will be described.

Figure 2:
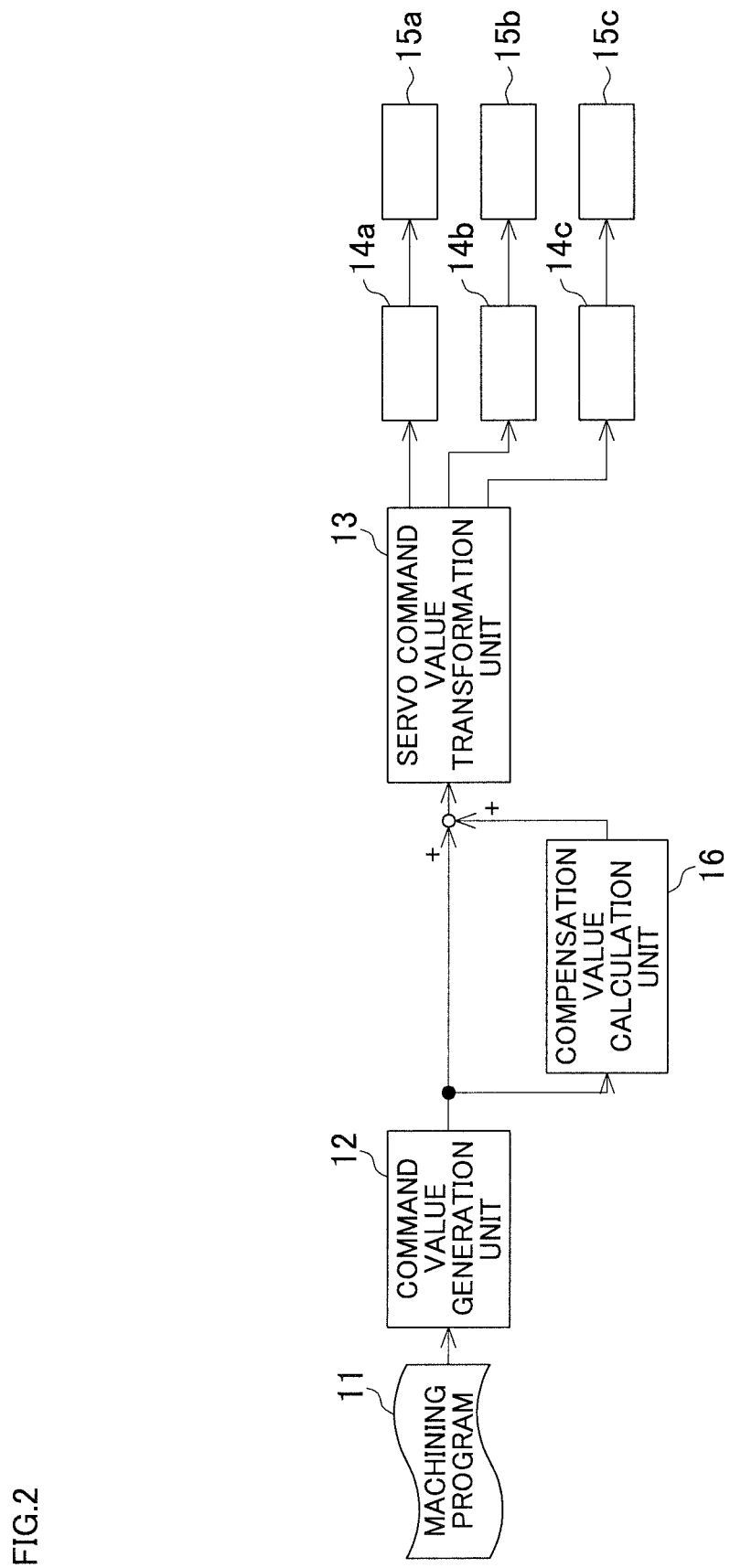
FIG. 2 is a block diagram of a numerical control.

First, FIG. 2 is an exemplary numerical control by a numerical control device of the machining center. When a machining program 11 is input, a command value generation unit 12 generates command values for respective drive axes. A compensation value calculation unit 16 calculates compensation values of the respective axes based on the generated command values. Total values of the command value and the compensation value are transmitted to a servo command value transformation unit 13 to calculate servo command values. The servo command values of the respective axes are transmitted to servo amplifiers 14a to 14c of the respective axes. The servo amplifiers 14a to 14c of the respective axes drive servomotors 15a to 15c, respectively to control a relative position of a main spindle 2a with respect to a table 3.

A compensation parameter as a base of the compensation value includes positions of translational axes and errors at the positions as point cloud data. Compensation values between the respective points can be calculated by an interpolation, such as a linear interpolation.

Figure 3:
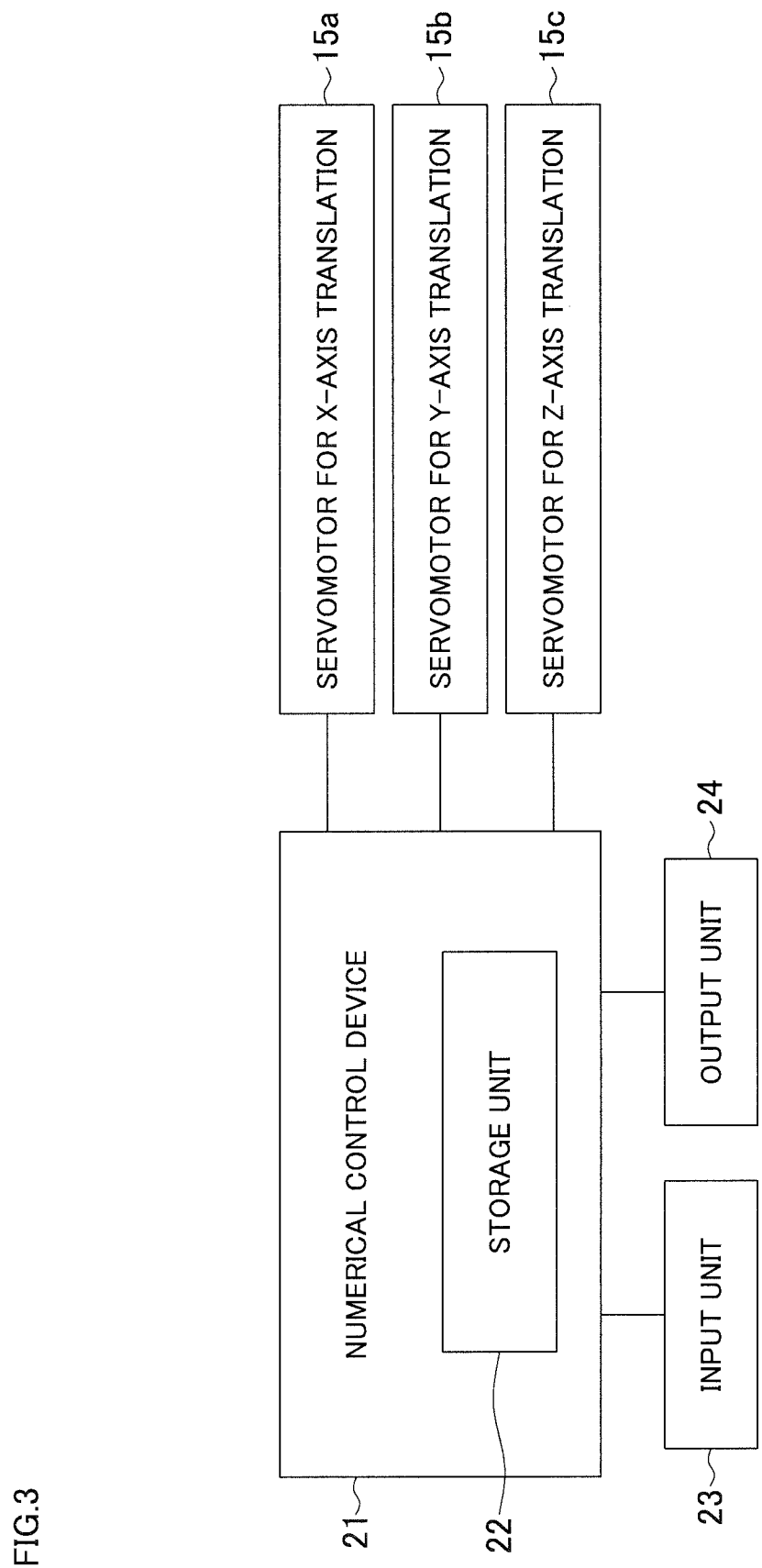
FIG. 3 is a block diagram illustrating a numerical control device.

As illustrated in FIG. 3, a numerical control device 21 includes a storage unit 22 configured to store the compensation parameter, the calibration-master condition, and the like. The numerical control device 21 includes an input unit 23 for inputting a measurement object and the like and an output unit 24, such as a display unit, that transmits information to an operator.

Furthermore, the numerical control device 21 functions as a calibration-master condition outputting unit, a calibration master measuring unit, an error value calculating unit, and a compensation parameter calculating unit of the disclosure.

Figure 4:
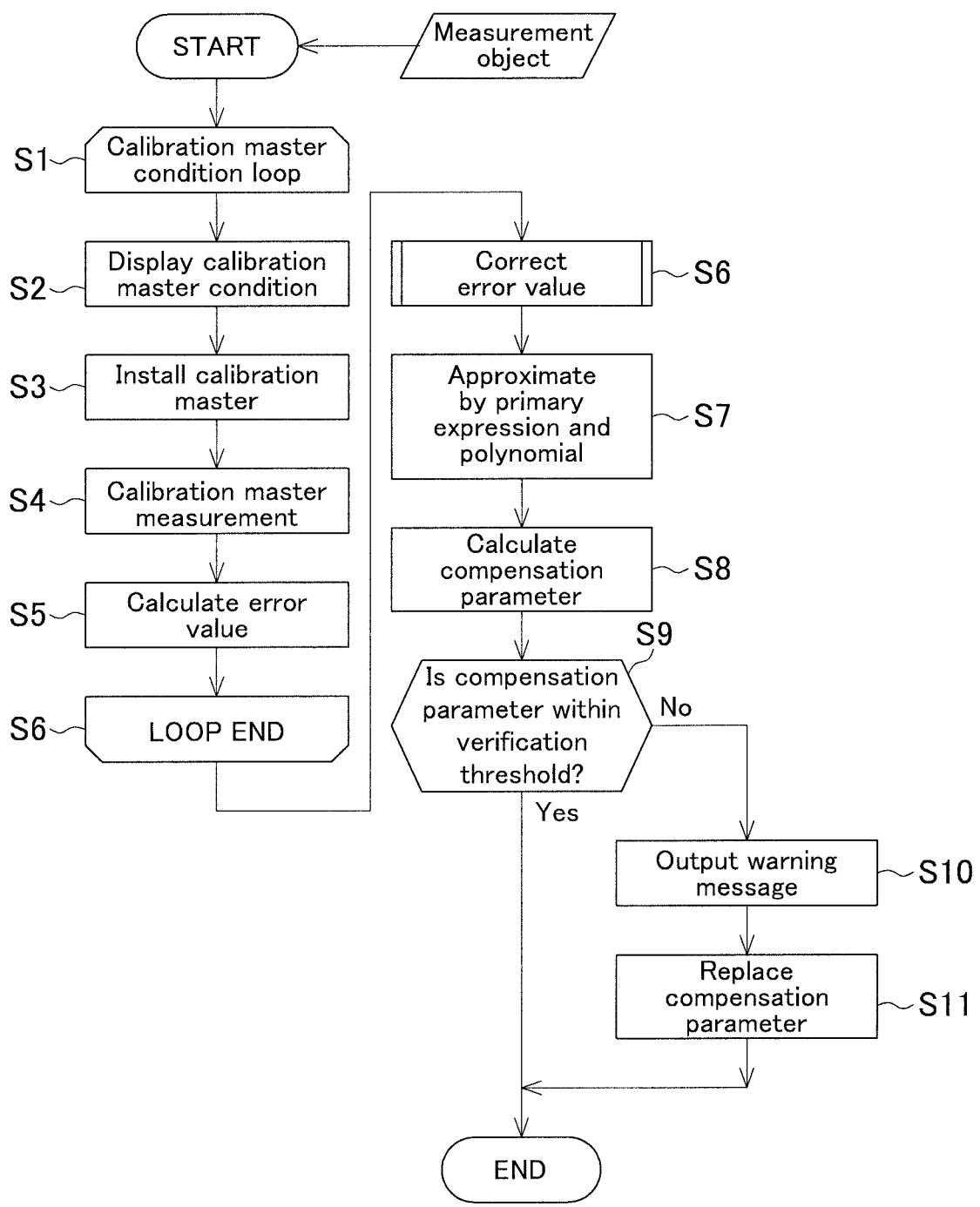
FIG. 4 is a flowchart of an error compensation method of the disclosure.

Subsequently, an error compensation method of the disclosure executed by the numerical control device 21 will be described based on the flowchart of FIG. 4.

At first, the measurement object is input from the operator by the input unit 23. The measurement object is associated with at least one calibration-master condition. In the calibration-master condition, a calibration master type, an installation direction, and an installation position are preliminarily determined. The calibration-master conditions input in S1 are sequentially displayed on the output unit 24 (S2: calibration-master condition outputting step), and the operator installs the calibration master on the table 3 in accordance with the output calibration-master condition (S3: calibration master installing step). Here, the measurement object includes positioning errors and straightnesses of the X-axis and the Y-axis, and the calibration-master condition as illustrated in FIG. 5 is an example.

Figure 6:
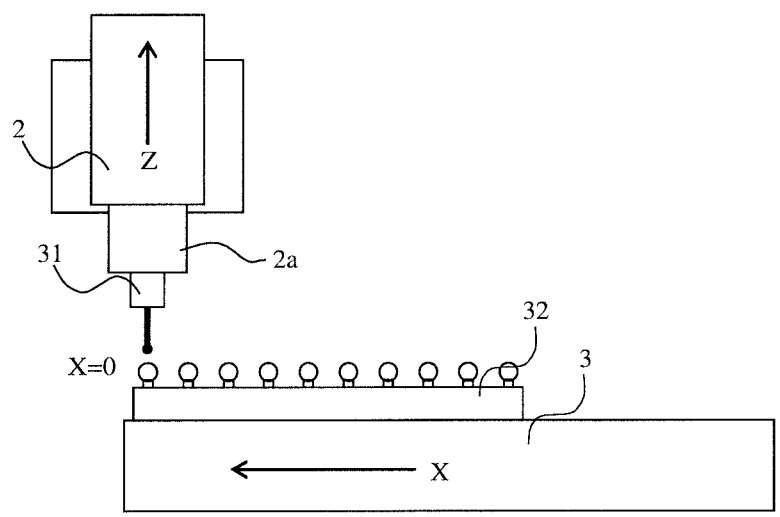
FIG. 6 is a schematic diagram of a touch probe and a calibration master installed on a table.
Figure 7:
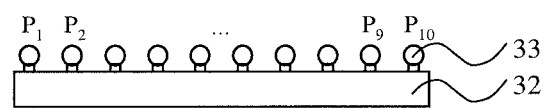
FIG. 7 is an exemplary calibration master.

In accordance with a calibration-master condition 1 displayed in S2, a calibration master 32 is installed at a position of X=0 so as to be parallel to the X-axis as illustrated in FIG. 6 in S3. The calibration master 32 of the example includes a plurality of target balls 33 ($P_1$ to $P_{10}$) for which relative positions are calibrated as illustrated in FIG. 7.

Next, the positions of the target balls 33 on the installed calibration master 32 are measured using a touch probe 31 mounted to the main spindle 2a (S4: calibration master measuring step). By measuring the target balls 33, measurement values $X_i$, $Y_i$, $Z_i$ (i=1 to 10) of positions of target balls $P_i$ (i=1 to 10) are obtained.

The compensation value calculation unit 16 of the numerical control device 21 uses Math. 1 below to obtain error values $\delta_{xi}$, $\delta_{yi}$, $\delta_{zi}$ of the measurement values of the target balls $P_i$ having relative positions of the target balls $P_i$ to the target ball $P_1$ as $X_{Ci}$, $Y_{Ci}$, $Z_{Ci}$ (S5: error value calculating step).

It should be note that since $P_1$ is the reference, the error values $\delta_{xi}$, $\delta_{yi}$, $\delta_{zi}$ at i=1 is 0.

$$\delta_{xi}=(X_i-X_1)-X_{Ci}$$

$$\delta_{yi}=(Y_i-Y_1)-Y_{Ci}$$

$$\delta_{zi}=(Z_i-Z_1)-Z_{Ci} \qquad \text{[Math. 1]}$$

By sequentially executing S2 to S5 described above while changing the type, the installation direction, and the installation position of the calibration master 32 in accordance with the displayed calibration-master conditions, the compensation value calculation unit 16 can obtain error values $\delta_{xi,j}$, $\delta_{yi,j}$, $\delta_{zi,j}$ and measurement values $X_{i,j}$, $Y_{i,j}$, $Z_{i,j}$ of the positions of the target balls 33 for each calibration-master condition j.

Figure 8:
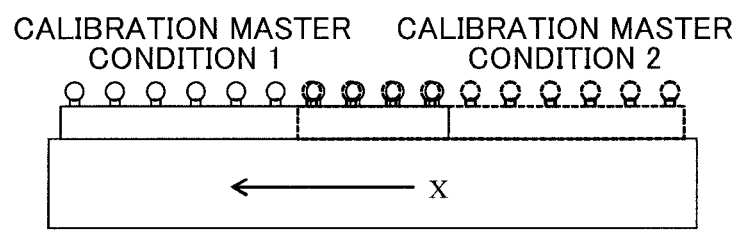
FIG. 8 is an exemplary installation method of the calibration master under the calibration-master conditions having the same installation direction.
Figure 9:
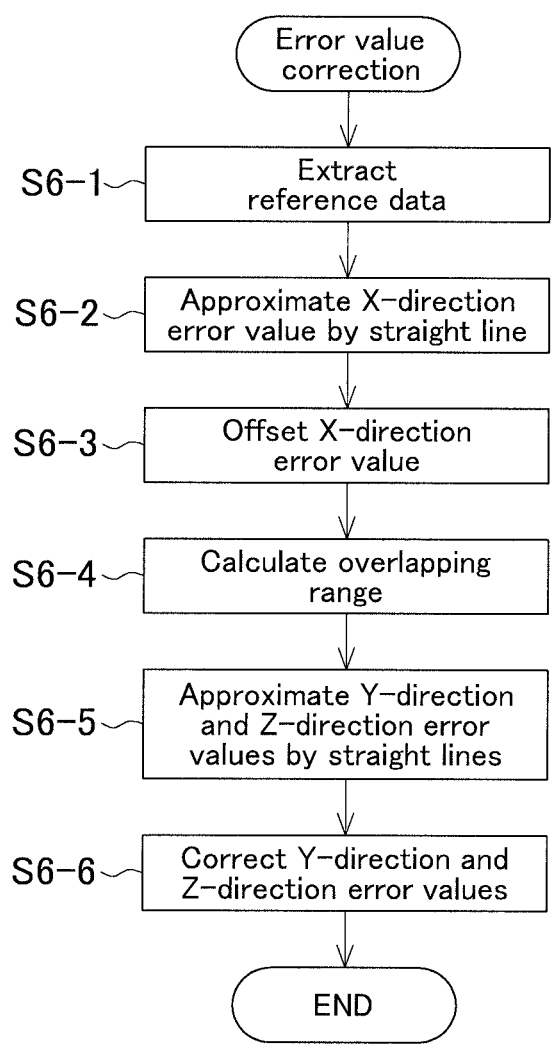
FIG. 9 is a flowchart of a method for correcting an error value.

Next, the compensation value calculation unit 16 corrects the error values obtained under the calibration-master conditions 1, 2 both having the installation direction in the X-direction as illustrated in FIG. 8 among the error values obtained under all the calibration-master conditions (S6). The method for correcting the error value will be described based on the flowchart of FIG. 9.

Figure 10:
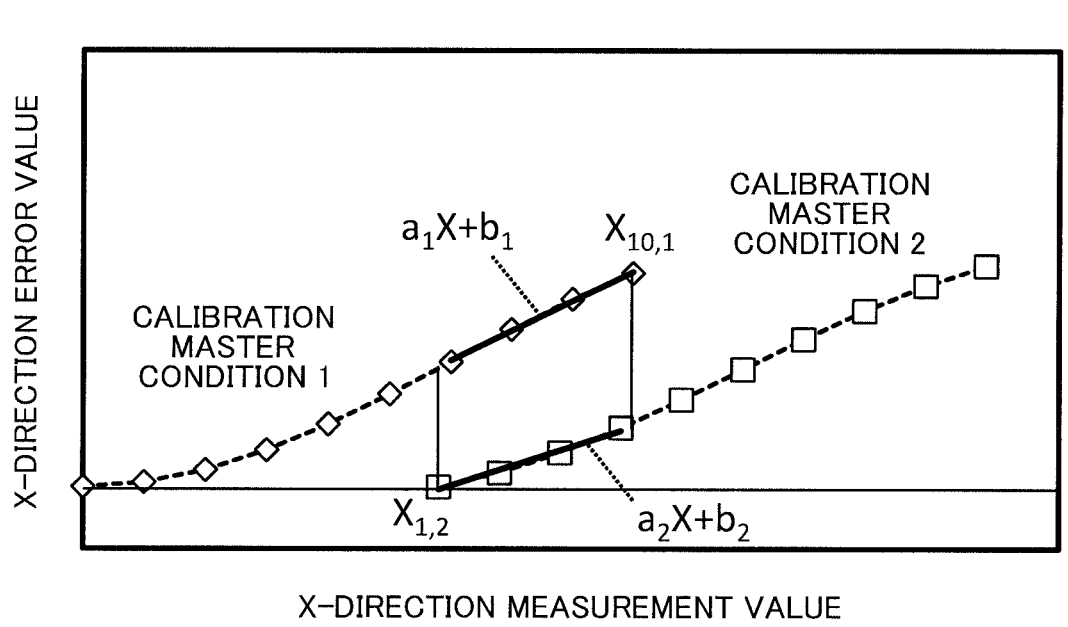
FIG. 10 is an example of error values and measurement values of a positioning error under a plurality of calibration-master conditions.

First, the method for correcting the positioning error (here, X-direction error value) in S6-1 to S6-3 will be described with exemplary data of the measurement values and the error values as illustrated in FIG. 10.

At first, data referred in correcting the error value is extracted (S6-1). Here, the measurement values $X_{1,1}$ to $X_{10,1}$ of the positions of the target balls 33 under a calibration-master condition 1 (first calibration-master condition in which the installation position is a negative side) are compared with the measurement values $X_{1,2}$ to $X_{10,2}$ of the positions of the target balls 33 under a calibration-master condition 2 (second calibration-master condition in which the installation position is a positive side). Then, an overlapping range $X_{7,1}$ to $X_{10,1}$ (positive end), $X_{1,2}$ to $X_{4,2}$ (negative end) is set as reference data. As another method, two end points of the respective calibration-master conditions, $X_{9,1}$, $X_{10,1}$ and $X_{1,2}$, $X_{2,2}$ may be set as the reference data.

The extracted reference data is approximated by straight lines, and slopes $a_1$, $a_2$ and intercepts $b_1$, $b_2$ of the approximate straight lines are obtained (S6-2).

Figure 11:
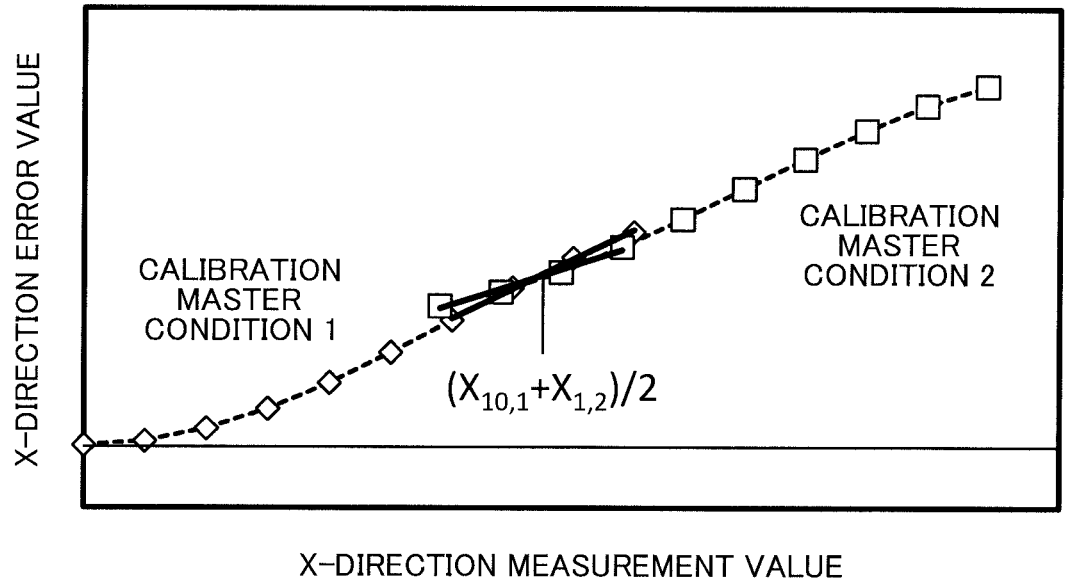
FIG. 11 is an example of corrected error values and the measurement values of the positioning error under a plurality of calibration-master conditions.

The obtained slopes and intercepts are used to offset the error values $\delta_{xi,2}$ (i=1 to 10) of the calibration-master condition 2 by Math. 2 below such that the approximate straight lines intersect at an intermediate point $(X_{10,1}+X_{1,2})/2$ between the two measurement values of the calibration-master conditions 1, 2 as illustrated in FIG. 11, thereby obtaining corrected error values $\delta_{xi,2}'$ (S6-3).

$$\delta_{xi,2}'=\delta_{xi,2}+(a_1-a_2)(X_{10,1}+X_{1,2})/2+(b_1-b_2) \qquad \text{[Math. 2]}$$

Figure 12:
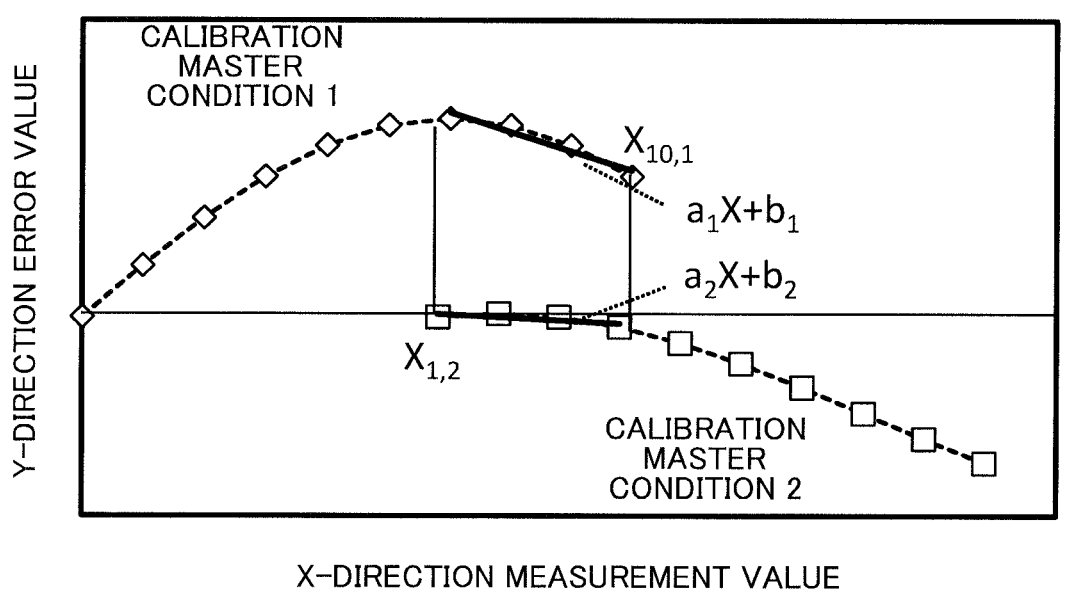
FIG. 12 is an example of error values and a measurement values of a straightness under a plurality of calibration-master conditions.

Subsequently, the method for correcting the straightness (here, error values in Y-direction, Z-direction) in S6-4 to S6-6 will be described with exemplary data of the measurement values and the error values as illustrated in FIG. 12. While the description will be given with the example of the Y-direction error value, the same applies to the correction method of the Z-direction error value.

The measurement values $X_{1,1}$ to $X_{10,1}$ of the positions of the target balls 33 under the calibration-master condition 1 are compared with the measurement values $X_{1,2}$ to $X_{10,2}$ of the positions of the target balls 33 under the calibration-master condition 2, thus obtaining the overlapping ranges $X_{7,1}$ to $X_{10,1}$, $X_{1,2}$ to $X_{4,2}$ (S6-4).

Next, the error values $\delta_{y7,1}$ to $\delta_{y10,1}$, $\delta_{y1,2}$ to $\delta_{y4,2}$ in the overlapping ranges are each approximated by a straight line, thereby obtaining slopes $a_1$, $a_2$ and intercepts $b_1$, $b_2$ of the straight lines (S6-5).

Figure 13:
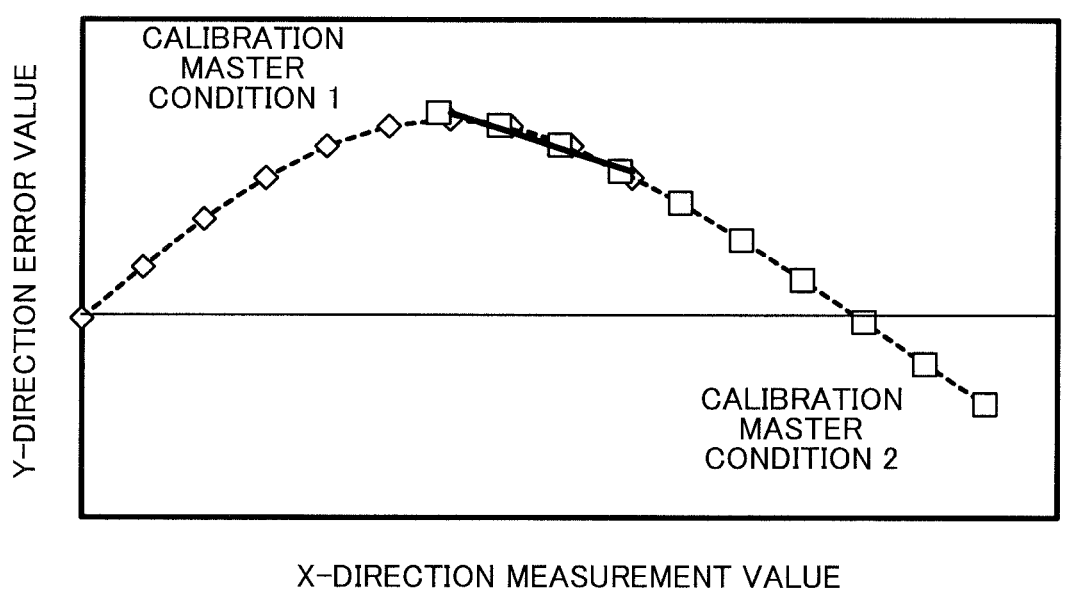
FIG. 13 is an example of corrected error values and the measurement values of the straightness under a plurality of calibration-master conditions.

The error values $\delta_{yi,2}$ (i=1 to 10) of the calibration-master condition 2 are corrected by Math. 3 below such that the obtained two approximate straight lines match as illustrated in FIG. 13, thus obtaining corrected error values $\delta_{yi,2}'$ (S6-6).

$$\delta_{yi,2}'=\delta_{yi,2}+(a_1-a_2)X_{1,2}+(b_1-b_2) \qquad \text{[Math. 3]}$$

Subsequently, the error values corrected in S6 are approximated by each of a straight line and a curve (S7). When the approximate curve is an m-th order polynomial, the X-direction error value $\delta_x'$ can be approximated as Math. 4 below using the measurement value X.

$$\delta_x' = c_{x0} + c_{x1}X + \ldots + c_{xm}X^m \quad \text{[Math. 4]}$$

By assigning the error values and the measurement values, which are obtained under the calibration-master conditions 1, 2 both having the installation directions in the X-directions, in Math. 4, Math. 5 below is obtained.

$$\begin{bmatrix} \delta x_1' \\ \delta x_2' \\ \vdots \\ \delta x_N' \end{bmatrix} = \begin{bmatrix} 1 & X_1 & \cdots & X_1^m \\ 1 & X_2 & \cdots & X_2^m \\ \vdots & \vdots & & \vdots \\ 1 & X_N & \cdots & X_N^m \end{bmatrix} \begin{bmatrix} c_{x0} \\ c_{x1} \\ \vdots \\ c_{xm} \end{bmatrix} \quad \text{[Math. 5]}$$

By solving Math. 5 for coefficients $c_{x0}, c_{x1}, c_{x2}, \ldots, c_{xm}$ of the polynomial, the approximate curve is obtained. In this respect, when the order m and the total number N of the error values have a relation of N−m>α (threshold α is an integer of 0 or more), the order m is corrected to m=N+α.

When the approximate straight line is a first-order polynomial, the coefficients $d_{x0}$, $d_{x1}$ of the first-order polynomial are similarly obtained with m=1 in Math. 5. The error values in the Y-direction, the Z-direction are also approximated by the similar method.

For the measurement result obtained under a calibration-master condition 3, since the installation direction is the Y-direction, a measurement value Y is used instead of the measurement value X, thus performing the similar calculation.

Based on the obtained approximate curve and approximate straight line, the compensation value calculation unit 16 calculates the compensation parameter (S8: compensation parameter calculating step). The compensation parameter is point cloud data of the command values of points n of the respective axes.

First, the compensation parameter for the positioning error (X-direction error) of the X-axis is calculated.

The minimum value and the maximum value of the measurement values under the calibration-master conditions 1, 2 having the installation directions in the X-direction are defined as $X_{min}$ and $X_{max}$. When the command values $X_k$ (k=1 to n) of the X-axis are $X_{min} \leq X_k \leq X_{max}$, compensation parameters $E_{xxk}$ of the positioning errors of the X-axis can be calculated by Math. 6 below.

$$E_{xxk} = c_{x0} + c_{x1}X_k + \ldots + c_{xm}X_k^m \quad \text{[Math. 6]}$$

Meanwhile, when the command value $X_k$ of the X-axis is out of the measurement range ($X_k < X_{min}$ or $X_k > X_{max}$), only an expansion/contraction component of the entire axis is compensated. Therefore, the compensation parameter $E_{xxk}$ can be expressed by Math. 7 below.

In the case of $X_k < X_{min}, E_{xxk} = d_{x1}(X_k - X_{min}) + E_{xxmin}$

In the case of $X_k > X_{max}, E_{xxk} = d_{x1}(X_k - X_{max}) + E_{xxmax}$

Note that, $E_{xxmin} = c_{x0} + c_{x1}X_{min} + \ldots + c_{xm}X_{min}^m$ $$E_{xxmax} = c_{x0} + c_{x1}X_{max} + \ldots + c_{xm}X_{max}^m \quad \text{[Math. 7]}$$

Next, the compensation parameter for the straightness (errors in Y-direction, Z-direction) of the X-axis is calculated. The compensation parameters $E_{yxk}$, $E_{zxk}$ of the straightness when the command value $X_k$ is $X_{min} \leq X_k \leq X_{max}$ are obtained as Math. 8 below by removing the influence of installation tilt of the calibration master 32 using the approximate straight line.

$$E_{yxk} = c_{y0} + c_{y1}X_k + \ldots + c_{ym}X_k^m - (d_{y0} + d_{y1}X_k)$$

$$E_{zxk} = c_{z0} + c_{z1}X_k + \ldots + c_{zm}X_k^m - (d_{z0} + d_{z1}X_k) \quad \text{[Math. 8]}$$

Meanwhile, when the command value $X_k$ of the X-axis is out of the measurement range ($X_k < X_{min}$ or $X_k > X_{max}$), the compensation parameters when the command value of the X-axis is $X_{min}$ and $X_{max}$ can be substituted.

After the calculation of the compensation parameter, it is determined whether an absolute value of the compensation parameter exceeds a verification threshold $E_{thr}$ or not (S9). Here, the compensation parameter $E_{xxk}$ will be described as an example.

When the absolute value of the compensation parameter $E_{xxk}$ (k=1 to n) exceeds the verification threshold, a warning message is output to the output unit 24 (S10). Then, the replacement to $E_{xxk} = E_{thr}$ is performed in the case of the compensation parameter $E_{xxk} > 0$ and the replacement to $E_{xxk} = -E_{thr}$ is performed in the case of $E_{xxk} < 0$ (S11). The same applies to $E_{yxk}$, $E_{zxk}$.

The other axes are inherently similar to the X-axis, and the calculation of the compensation parameter and the determination by the verification threshold are performed by the method similar to that of the X-axis.

Thus, the machining center of the above-described configuration, as the error compensation method, executes the calibration-master condition outputting step, the calibration master installing step, the calibration master measuring step, the error value calculating step, and the compensation parameter calculating step. The calibration-master condition outputting step is a step of outputting the calibration-master condition to the output unit 24. The calibration master installing step is a step of installing the calibration master 32 on the table 3 in accordance with the output calibration-master condition. The calibration master measuring step is a step of obtaining the measurement values of the positions of the target balls 33 by detecting the positions of the plurality of target balls 33 (targets) under the calibration-master condition using the touch probe 31 (sensor) mounted to the main spindle 2a. The error value calculating step is a step of calculating the error value using the measurement value obtained under the calibration-master condition and the relative positions of the target balls $P_i$ to the target ball $P_1$ (calibration value of the positions of the targets). The compensation parameter calculating step is a step of approximating the relation between the measurement values and the error values by the curve and the straight line, calculating the compensation parameter of the positioning error of the translational axis based on an approximate curve when the command value is in the measurement range (a partial range of the stroke of the translational axis), and calculating the compensation parameter of the positioning error based on an approximate straight line when the command value is out of the measurement range (another range of the stroke of the translational axis).

According to the configuration, by simply installing the calibration master 32 in accordance with the calibration-master condition output to the output unit 24, it is allowed for even an unskilled operator to execute the measurement to set the compensation parameter.

Since the measurement result is approximated by the curve and the compensation parameter is calculated based on an approximate curve, the motion error due to the measurement variation in the compensation control can be reduced. Especially, not only the compensation control with high accuracy using the compensation parameter based on an approximate curve is performed within the measurement range of the calibration master 32, but also the compensation control using the compensation parameter based on an approximate straight line is performed even out of the measurement range. Therefore, the motion error can be reduced in the entire range of the stroke of the translational axis.

While the error value is corrected in S6 in the above-described configuration, the step is may be omitted.

In the compensation parameter calculating step of S8, the correction of the error value by correcting the compensation parameter of the straightness may be omitted.

In addition, the configuration of the calibration master, and the configuration and the number of the target balls are not limited the above-described configuration, and may be changed as necessary. The machine tool is not limited to the machining center.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An error compensation method for a machine tool for compensating a motion error of a translational axis in accordance with a compensation parameter in the machine tool, wherein
    the machine tool includes two or more translational axes, a table configured to hold a workpiece, and a main spindle configured to hold a tool, the translational axes enable a relative motion of two degrees or more of translational freedom of the tool held onto the main spindle with respect to the workpiece, and the machine tool includes an output unit,
    the error compensation method comprising:
        outputting at least one of a plurality of calibration-master conditions to the output unit, the calibration-master conditions including a type of a calibration master that includes a plurality of targets, an installation direction of the calibration master, and an installation position of the calibration master;
        installing the calibration master on the table in accordance with the output calibration-master condition;
        obtaining measurement values of positions of the targets by detecting the positions of the plurality of targets under the calibration-master condition using a sensor mounted to the main spindle;
        calculating an error value using the measurement value obtained under the calibration-master condition and a calibration value of the position of the target;
        approximating a relation between the measurement values and the error values by a curve and a straight line, calculating the compensation parameter of a positioning error of the translational axis based on an approximate curve in a partial range of a stroke of the translational axis, and calculating the compensation parameter of the positioning error based on an approximate straight line in another range of the stroke of the translational axis and
    wherein the approximating includes obtaining one of the approximate curve or the approximate straight line for the error values and the measurement values obtained under the calibration-master condition.

2. The error compensation method for the machine tool according to claim 1, wherein
    in the approximating, when the compensation parameter of the positioning error is calculated,
        a part of a relation between the error values and the measurement values is approximated by a straight line under a first calibration-master condition in a combination of the two calibration-master conditions among the plurality of calibration-master conditions, the first calibration-master condition has the installation position on a negative side,
        a part of the relation between the error values and the measurement values is approximated by a straight line under a second calibration-master condition that has the installation position on a positive side, and
        the error value is offset such that the approximate straight line of the first calibration-master condition and the approximate straight line of the second calibration-master condition have an intersection point at an intermediate point between the measurement value at a positive end in the installation direction of the first calibration-master condition and the measurement value at a negative end of the second calibration-master condition.

3. The error compensation method for the machine tool according to claim 1, wherein
    the approximating further includes calculating a compensation parameter related to a straightness of the translational axis, and
    in the calculating of the compensation parameter of the straightness, the error values are corrected such that approximate straight lines of the relations between the error values and the measurement values under the respective calibration-master conditions match in a range in which the measurement values of the plurality of calibration-master conditions overlap.

4. The error compensation method for the machine tool according to claim 1, wherein
    in the approximating, the approximate curve is a polynomial, and
    when a difference between a count of the error values and an order of the polynomial is less than a predetermined threshold, the order is decreased.

5. The error compensation method for the machine tool according to claim 1, wherein
    in the approximating, when a maximum value of an absolute value of the calculated compensation parameter exceeds a predetermined verification threshold, a fact that the compensation parameter is excessive is notified by the output unit.

6. The error compensation method for the machine tool according to claim 5, wherein
    in the approximating, when the maximum value of the absolute value of the calculated compensation parameter exceeds the verification threshold, the compensation parameter is replaced such that the absolute value of the compensation parameter becomes same as the verification threshold.

7. A machine tool configured to compensate a motion error of a translational axis in accordance with a compensation parameter, wherein the machine tool includes two or more translational axes, a table configured to hold a workpiece, and a main spindle configured to hold a tool, the translational axes enable a relative motion of two degrees or more of translational freedom of the tool held onto the main spindle with respect to the workpiece, and the machine tool including an output unit, the machine tool comprising:
- a calibration-master condition outputting unit that outputs at least one of a plurality of calibration-master conditions to the output unit, the calibration-master conditions including a type of a calibration master that includes a plurality of targets, an installation direction of the calibration master, and an installation position of the calibration master;
- a calibration master measuring unit that obtains measurement values of positions of the targets by detecting the positions of the plurality of targets under the calibration-master condition using a sensor mounted to the main spindle in a state where the calibration master is installed on the table in accordance with the output calibration-master condition;
- an error value calculating unit that calculates an error value using the measurement value obtained under the calibration-master condition and a calibration value of the position of the target; and
- a compensation parameter calculating unit that approximates a relation between the measurement values and the error values by a curve and a straight line, calculates the compensation parameter of a positioning error of the translational axis based on an approximate curve in a partial range of a stroke of the translational axis, and calculates the compensation parameter of the positioning error based on an approximate straight line in another range of the stroke of the translational axis.

* * * * *